(12) United States Patent
Murata

(10) Patent No.: US 6,272,081 B1
(45) Date of Patent: Aug. 7, 2001

(54) OPTICAL DISK AND OPTICAL DISK REPRODUCTION SYSTEM

(75) Inventor: Morihiro Murata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/195,939

(22) Filed: Nov. 19, 1998

(30) Foreign Application Priority Data

Nov. 28, 1997 (JP) .................................................. 9-329059

(51) Int. Cl.[7] .................................................... G11B 7/00
(52) U.S. Cl. ................................... 369/47.15; 369/47.21; 369/53.2; 369/53.41
(58) Field of Search ........................... 369/47, 48, 49, 369/50, 53, 54, 58, 59, 32, 47.1, 47.11, 47.15, 47.16, 47.21, 47.22, 53.1, 53.2, 53.41, 59.1

(56) References Cited

U.S. PATENT DOCUMENTS 5,058,096 * 10/1991 Ando et al. ............................. 369/53
5,825,731 * 10/1998 Yokota .................................... 369/48

* cited by examiner

*Primary Examiner*—Muhammad Edun
(74) *Attorney, Agent, or Firm*—Pillsbury Winthrop LLP

(57) ABSTRACT

In an optical disk having various information recorded thereon on a frame-by-frame basis, each of the frames being organized in a predetermined format comprising a main channel where data are recorded and a subcode providing additional information including recorded positions of the data, table-of-contents or TOC information for the data recorded in the main channel is contained in the main channel of the optical disk. When a subcode block representing a single unity of information is formed of a plurality of the subcodes belonging to 98 EFM frames, the table-of-contents information is recorded in the main channels of the 98 frames in such a manner that every piece of information needed as the table-of-contents information is fully accommodated in a predetermined data block made up of the data of the main channels belonging to the 98 frames. Thus, there can be provided an optical disk and optical disk reproduction system which permit high-speed readout of the TOC information.

14 Claims, 11 Drawing Sheets

TOC INFORMATION

| Sub-Code frame No. | POINT | TIME | | | PTIME | | |
|---|---|---|---|---|---|---|---|
| | | MIN | SEC | FRAME | PMIN | PSEC | PFRAME |
| n | 01 | 01 | 32 | 01 | 00 | 02 | 07 |
| n+1 | 01 | 01 | 32 | 02 | 00 | 02 | 07 |
| n+2 | 01 | 01 | 32 | 03 | 00 | 02 | 07 |
| n+3 | 02 | 01 | 32 | 04 | 02 | 04 | 05 |
| n+4 | 02 | 01 | 32 | 05 | 02 | 04 | 05 |
| n+5 | 02 | 01 | 32 | 06 | 02 | 04 | 05 |
| ⋮ | ⋮ | ⋮ | ⋮ | ⋮ | ⋮ | ⋮ | ⋮ |
| n+m | A0 | 01 | 34 | 31 | 01 | 00 | 00 |
| n+m+1 | A0 | 01 | 34 | 32 | 01 | 00 | 00 |
| n+m+2 | A0 | 01 | 34 | 33 | 01 | 00 | 00 |
| n+m+3 | A1 | 01 | 34 | 34 | 60 | 00 | 00 |
| n+m+4 | A1 | 01 | 34 | 35 | 60 | 00 | 00 |
| n+m+5 | A1 | 01 | 34 | 36 | 60 | 00 | 00 |
| n+m+6 | A2 | 01 | 34 | 37 | 60 | 10 | 08 |
| n+m+7 | A2 | 01 | 34 | 38 | 60 | 10 | 08 |
| n+m+8 | A2 | 01 | 34 | 39 | 60 | 10 | 08 |

OPTICAL DISK AND OPTICAL DISK REPRODUCTION SYSTEM

BACKGROUND OF THE INVENTION

The present invention relates generally to optical disks, such as CDs (Compact Disks) and DVDs (Digital Versatile Disks), and optical disk reproduction systems, and more particularly to an improved method of recording TOC (Table-OF-Contents) information on an optical disk.

In optical disks such as CDs (Compact Disks), TOC (Table-OF-Contents) information is used to make instantaneous access to a start point of a designated recording track. It has been conventional to record such TOC information as subcodes in a lead-in area of the disk. Specifically, as shown FIG. 11. the optical disks generally include a lead-in area LIA disposed along its inner periphery, a lead-out area LOA disposed along its outer periphery, and a program area PGA located in between the lead-in area LIA and the lead-out area LOA. These three areas each contain recording units called "EFM (Eight to Fourteen Modulation)" frames. Each of the EFM frames, as illustratively shown in FIG. 12, includes a synchronizing bit, a subcode (one symbol), data (12 symbols), P parity bits (four symbols), data (12 symbols) and Q parity bits (four symbols), and the 12-symbol data and P and Q parity bits constitute data of a main channel. Thus, each of the EFM frames of the optical disk contains a total of 33 symbols in the main channel and subcode channel: 32 symbols in the main channel; and one symbol in the subcode channel. Because each of the symbols consists of "14+3" bits and "24+3" bits are used as the synchronizing bit, each of the EFM frames has a total length of "24+3+(14+3)×33" (=588) bits. The subcodes of 98 such EFM frames together constitute a single subcode block that represents a single unity of information, and TOC (Table-OF-Contents) information is recorded in the subcode block of the lead-in area LIA.

FIG. 13 shows one of the subcode blocks in the lead-in area LIA. The subcode in each of the EFM frames is EFM-decoded into one-byte or eight-bit data, and unique channel names "P" to "W" are allocated respectively to the eight bits of the decoded subcode. The subcodes of the first two EFM frames are called "S0" and "S1" codes, which are used as a synchronizing signal. A group of the subcodes of channel Q in 96 EFM frames is commonly called a "subcode frame", and this subcode frame represents positional information of a track. In the subcode frame consisting of 96 Q-channel bits, bits Q1 to Q4 represent a data/audio flag, bits Q5 to Q8 represent an address, bits Q9 to Q16 represent a track number, bits Q17 to Q24 a start point, and bits Q25 to Q48 represent a relative position TIME of the subcode frame in the lead-in area LIA; the relative position data TIME comprises a set of three data MIN, SEC and FRAME indicative of minute, second and frame, respectively. Further, of the 96 Q-channel bits, bits Q57 to Q80 represent an absolute position PTIME of a track corresponding to a track number specified by the above-mentioned start point, the absolute position data PTIME comprises a set of data PMIN, PSEC and PFRAME. Last 16 bits Q81 to Q96 represent a CRC (Cyclic Redundancy Check) code to be used for error detection.

A plurality of such subcode frames arranged in the aforementioned manner together constitute TOC information as illustratively shown in FIG. 14. The TOC information indicates respective track numbers and start points of all of the tracks provided in the program area PGA. Because the subcodes themselves do not have error correcting capability, the same start point information of each one of the tracks is recorded repetitively three times in succession. Similarly, a same set of three types of control information, i.e., control information A0 (indicative of the leading or forefront track number, a type of the disk, etc.), control information A1 (indicative of the last track number) and control information A2 (indicative of a total recording time period), are recorded repetitively three times in succession in an end portion (corresponding to frame numbers "n+m" to "n+m+8" in the illustrated example) of the TOC information. Such TOC information is recorded repetitively in the lead-in area.

Today, the number of tracks recordable in the program area PGA differs depending on the type of the optical disk; the smallest number is just one while the greatest number is 99. Thus, the maximum number of subcode frames necessary for recording TOC information will be $$[99 \text{ (the number of the recordable tracks)}+3 \text{ (the number of the types of the control information)}]\times 3=306 \quad \text{Mathematical Expression (1)}$$

In the CDs (Compact Disks), 75 frames correspond to a time length of one second and it will take $1/75$ (=0.0133) seconds to read out a single subcode frame at the normal replay speed. Thus, with the CD having the greatest number of, i.e., 99 recordable tracks, it would take as long a time as 4 seconds to completely read out the TOC information.

Further, although read errors may be detected by use of the CRC code in the subcode frame, the subcode frame does not have error correcting capability. Thus, when some read error is detected, next one of the repetitively recorded TOC information has to be re-read, which would require an even longer readout time.

SUMMARY OF THE INVENTION

It is therefore an object of the present invention to provide an optical disk and optical disk reproduction system which allow table-of-contents (TOC) information on the disk to be read out at high speed.

In order to accomplish the above-mentioned object, the present invention provides an optical disk having various information recorded thereon on a frame-by-frame basis, each of the frames being organized in a predetermined format comprising a main channel where data are recorded and a subcode providing additional information including recorded positions of the data, which is characterized in that table-of-contents information for the data recorded in the main channels is contained in the main channels of the optical disk.

Because the table-of-contents or TOC information is recorded, rather than in the subcode channels, in the main channels having a much greater capacity than the subcode channels, the present invention can record the TOC or table-of-contents information collectively as a single data block, thereby eliminating the need for recording it dispersedly across a multiplicity of subcode frames as in the past. With such an arrangement, the present invention affords the superior benefit that the table-of-contents information can be read out collectively within a short period of time and hence at a greatly increased speed.

For that purpose, when a subcode block representing a single unity of information is formed of a plurality of the subcodes belonging to n frames, the table-of-contents information is contained in the main channels of the n frames in such a manner that every piece of information needed as the table-of-contents information is fully incorporated in a predetermined data block made up of the data of the main channels belonging to the n frames.

The table-of-contents information may be recorded in the main channels of any of the lead-in, program and lead-out areas of the optical disk. In the case where the table-of-contents information is recorded in the main channels of the lead-in area whose subcode has no absolute position information of its own, repetitive recording of the table-of-contents information substantially throughout the lead-in area would greatly facilitate retrieval or acquisition of the information. Because no substantive data is recorded in the lead-in area, such repetitive recording of the table-of-contents information throughout the lead-in area would not result in a waste of storage area.

Further, in the case where the table-of-contents information is recorded in the main channels of the program area or lead-out area, the table-of-contents information may be located in a particular recording position previously agreed upon between an optical disk drive device and a host system. Because absolute time information is attached to the program and lead-out areas, access for reading out the table-of-contents information can be made with ease. The table-of-contents information may be recorded as a file in the program area.

According to another aspect of the present invention, there is provided an optical disk drive device which comprises: a readout section that reads out recorded information from an optical disk having various information recorded thereon on a frame-by-frame basis. each of the frames comprising a main channel where data are recorded and a subcode providing additional information including recorded positions of the data, table-of-contents information for the data recorded in the main channel being contained in the main channel of the optical disk; a decoder section that decodes the recorded information read out by the readout section; and a system controller that, upon start of information readout by the readout section, reads out the recorded information from a position of the optical disk containing the table-of-contents information in predetermined order and deciphers the table-of-contents information, the system controller controlling access, by the readout section, to the optical disk on the basis of the table-of-contents information deciphered thereby.

In the optical disk drive device, the table-of-contents information read out and decoded by the decoder section is deciphered by the system controller, and thus the system controller can thereafter appropriately control access to the optical disk on the basis of the thus-deciphered table-of-contents information.

According to still another aspect of the present invention, there is provided an optical disk reproduction system which comprises: an optical disk drive device that reads out and decodes recorded information from among various information recorded on an optical disk on a frame-by-frame basis, each of the frames comprising a main channel where data are recorded and a subcode providing additional information including recorded positions of the data, table-of-contents information for the data recorded in the main channel being contained in the main channel of the optical disk, the optical disk drive device controlling information readout from the optical disk on the basis of the table-of-contents information; and a host system that deciphers the table-of-contents information, read out from the optical disk and decoded by the optical disk drive device, to provide deciphered table-of-contents information, and transfers the deciphered table-of-contents information back to the optical disk drive device.

According to the optical disk reproduction system, the optical disk drive device, which does not itself have capability to decipher the main channel data, reads out the table-of-contents information under the control of the host system and then transfers the read-out table-of-contents information to the host system, which in turn deciphers the information and transfers the deciphered table-of-contents information back to the optical disk drive device. With this arrangement, it is possible to effectively reduce loads on firmware of the disk drive device.

BRIEF DESCRIPTION OF THE DRAWINGS

For better understanding of the above and other features of the present invention, preferred embodiments of the invention will hereinafter be described in greater detail with reference to the accompanying drawings, in which:

FIG. 14 is a diagram explanatory of TOC information recorded on the optical disk shown in FIG. 11.

DETAILED DESCRIPTION OF THE PREFERRED EMBODIMENTS

Figure 1:
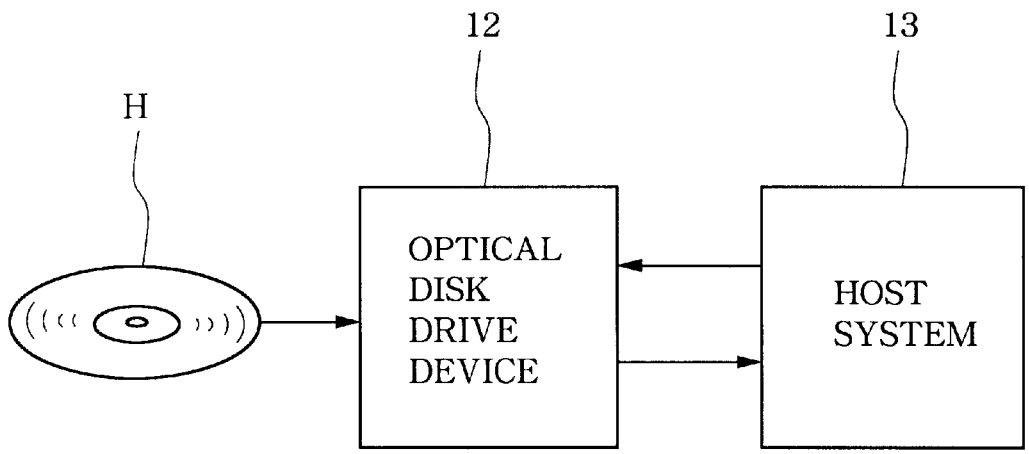
FIG. 1 is a block diagram schematically showing a general structure of an optical disk reproduction system in accordance with an embodiment of the present invention.

FIG. 1 is a block diagram schematically showing a general structure of an optical disk reproduction system in accordance with an embodiment of the present invention. The optical disk reproduction system includes an optical disk 11. an optical disk drive device 12 for driving the optical disk 11, and a host system for reading out necessary data from the disk 11 via the drive device 12.

Figure 2:
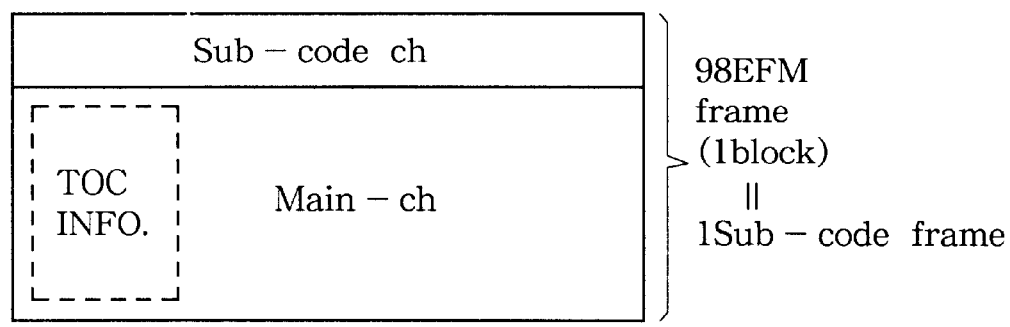
FIG. 2 is a diagram showing an exemplary format of a subcode block made up of 98 frames.
Figure 3A:
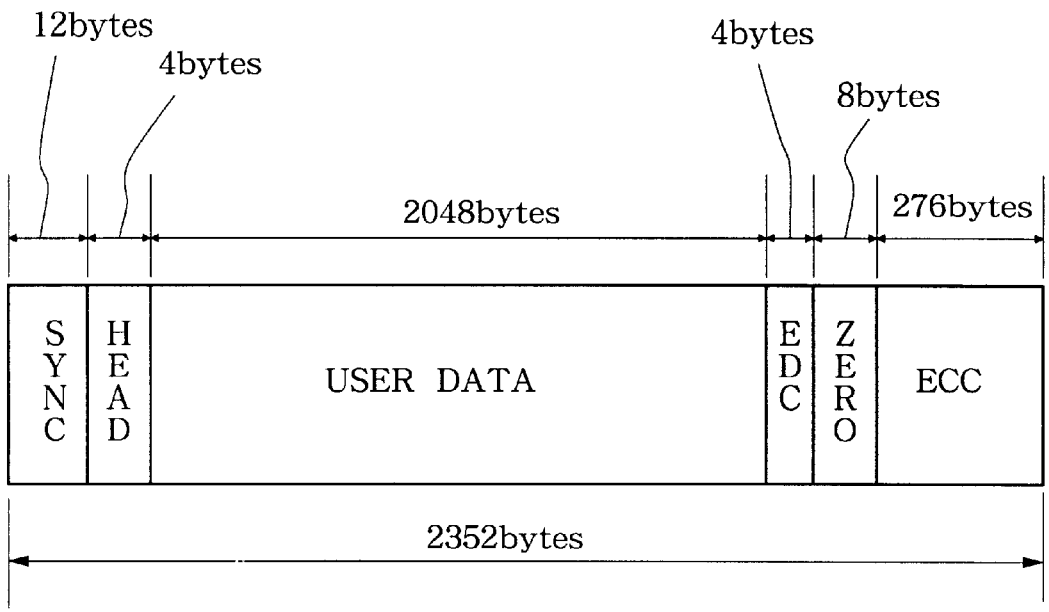
FIG. 3 is a diagram showing an exemplary format of a data block.
Figure 3B:
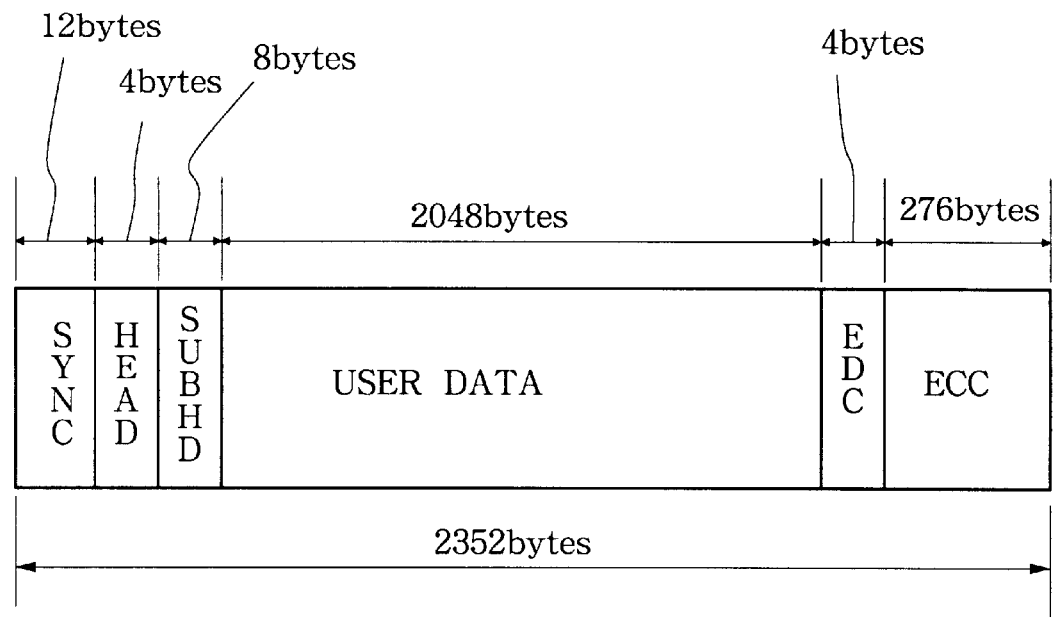

The optical disk 11 employed in this optical disk reproduction system is an optical recording medium, such as a CD, CD-ROM, CD-R, CD-RW, CD-DA, CD-1 and DVD, which is based on the aforementioned conventional recording format but is different from the conventional recording format in that TOC information is recorded in the main channels rather than in the subcode channels or as subcode data. Namely, as shown in FIG. 2, 98 EFM frames constituting a subcode block also constitute a single data block of the main channels representing a single unity of information. This data block provides 2,352 byte data as shown in FIG. 3, and these data are used in three different modes: mode 1; mode 2; and mode 3. FIG. 3A is explanatory of mode 1, where 2,048 bytes out of the 2,352 bytes are provided for use by a user. Further, in mode 1, first 12 bytes form a synchronizing pattern, and next four bytes form a header that is followed by 2,048 bytes of data. After the 2,048-byte data are attached a 4-byte EDC (Error Detection Code), 8-byte zero data and a 276-byte ECC (Error Correction Code). FIG. 3B is explanatory of mode 2, where 2,048 bytes out of the 2,352 bytes are provided for use by the user similarly to mode 1. Further, in mode 2, first two bytes form a synchronizing pattern, and next four bytes form a header that is followed by an 8-byte subheader and then by 2,048 bytes of data. After the 2,048-byte data are attached a 4-byte EDC (Error Detection Code) and a 276-byte ECC (Error Correction Code).

Assuming that a per-track quantity of data constituting the TOC information is ten bytes and the optical disk 11 has 99 recordable tracks, a total number of bytes used for recording the TOC information on the disk 11 may be determined as follows:

[99 (the number of the recordable tracks)+3 (the number of the types of the control information)]×10=1,020 bytes      Mathematical Expression (2)

Because error correcting capability by the ECC and EDC of the data block guarantees accuracy up to $10^{-12}$ in the embodiment, it is no longer necessary to record same data repetitively three times in succession as in the past. Thus, the 1,020 bytes is exactly a greatest quantity of data necessary for recording of the TOC information. This quantity of data can be fully accommodated within the above-mentioned 2,048-byte user data area in a single data block. Because it takes only 0.0133 seconds to completely read out one data block at the normal replay speed, the described embodiment can read out the TOC information at an extremely high speed.

Figure 4:
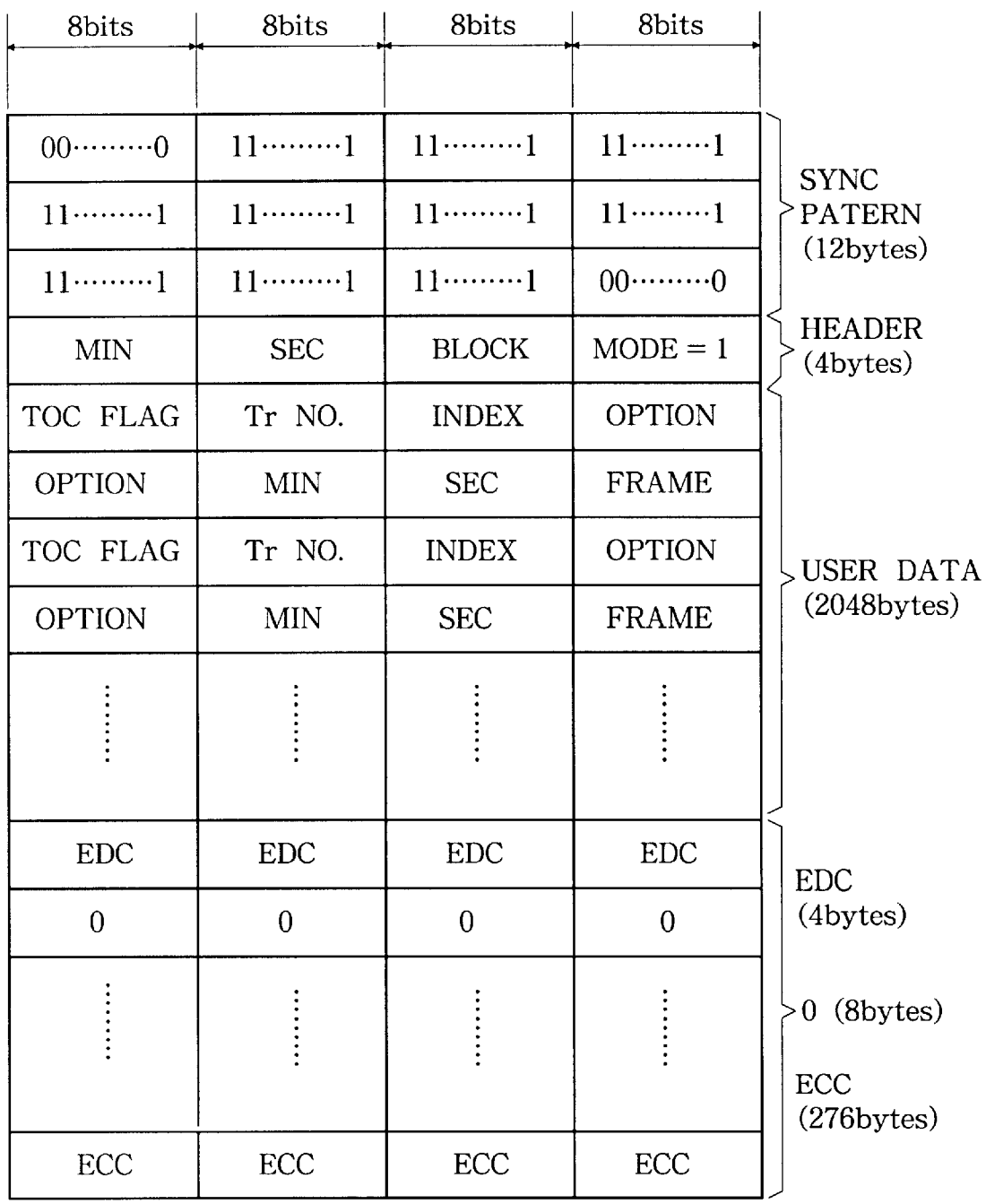
FIG. 4 is a diagram showing an exemplary recording format of TOC information in the data block when used in mode 1.

FIG. 4 is a diagram showing an exemplary recording format of the TOC information in the data block when used in mode 1. According to the format, the TOC information can be freely embedded in any other data, by being recorded immediately after TOC flag data indicating that it is TOC information.

More specifically, the TOC information may be recorded in any of the lead-in area LIA, program area PGA and lead-out area LOA. However, it is possible that the Q-channel subcodes in the lead-in area LIA do not include information on its absolute time position and header, in which case some time code may be required. If the same TOC information is recorded repetitively throughout the lead-in area LIA, such a time code is unnecessary because the TOC information can be read out by just accessing any segment in the lead-in area LIA. If the TOC information is recorded in the program area PDA, then it is desirable that the recorded data on the optical disk 11 be reproducible as ROM data or XA data in mode 1 or mode 2-form 1. Because, due to the fact that four bytes and 276 bytes are used as the EDC and ECC, respectively, in mode 1 or mode 2-form 1 usage, this arrangement would achieve higher error correcting capability for the TOC information than for audio data. Since the TOC information is used as control data, it is desirable that the TOC information should have high error correcting capability. The TOC information may be recorded as a file in the program area PGA.

Figure 5:
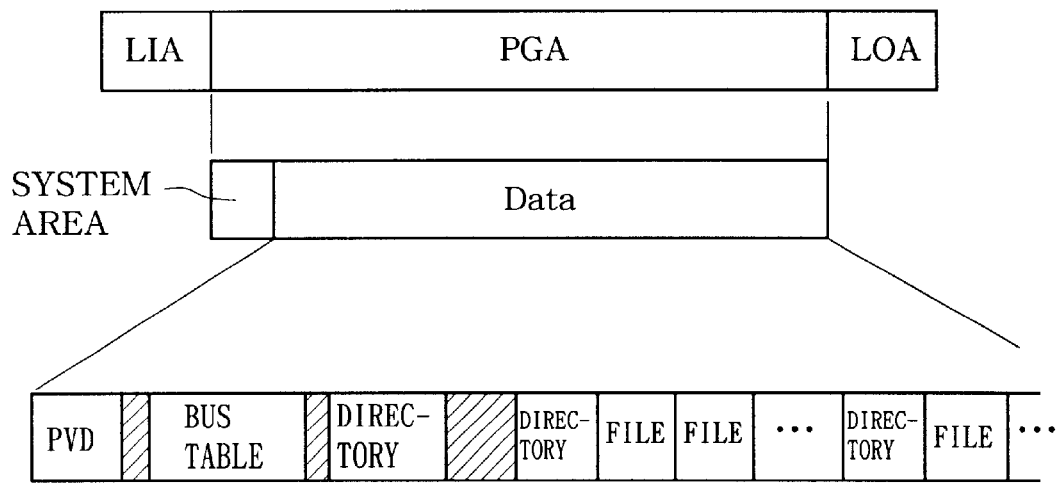
FIG. 5 is a diagram showing an exemplary organization of data stored in a program area in accordance with the ISO9660 format.
Figure 6:
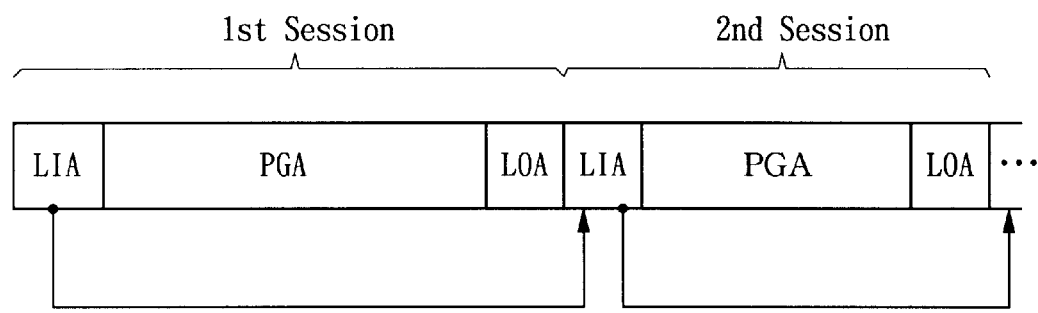
FIG. 6 is a diagram showing an exemplary organization of data recorded in a multisession scheme.

FIG. 5 is a diagram showing data stored in the program area PGA in accordance with the ISO9660 format. The program area PGA includes a system area, and a data area that contains a PVD (Primary Volume Descriptor), bus table, directory and files. In the data area, an empty space or gap is provided between the PVD (Primary Volume Descriptor), bus table, directory and files, and the file as the TOC information is recorded using such empty spaces.

The optical disk 11 has been described above in relation to the single-session recording scheme. In the case of the multisession recording scheme as generally used in CD-Rs, it is only necessary to determine recorded positions of the TOC information from a start point of a next session, to thereby sequentially acquire respective pieces of the TOC information in successive sessions. The TOC information contains pointer information indicative of a start time point of the program area in a next session (however, in the case of "FF: FF: FF", the next session would be the last one), in addition to the abovementioned control information A0 (indicative of the forefront track number, the type of the disk, etc.), control information A1 (indicative of the last track number) and control information A2 (indicative of a total recording time length). Thus, it is possible to make access to another possible recorded position of the TOC information in the next session, in accordance with the pointer information.

Figure 7:
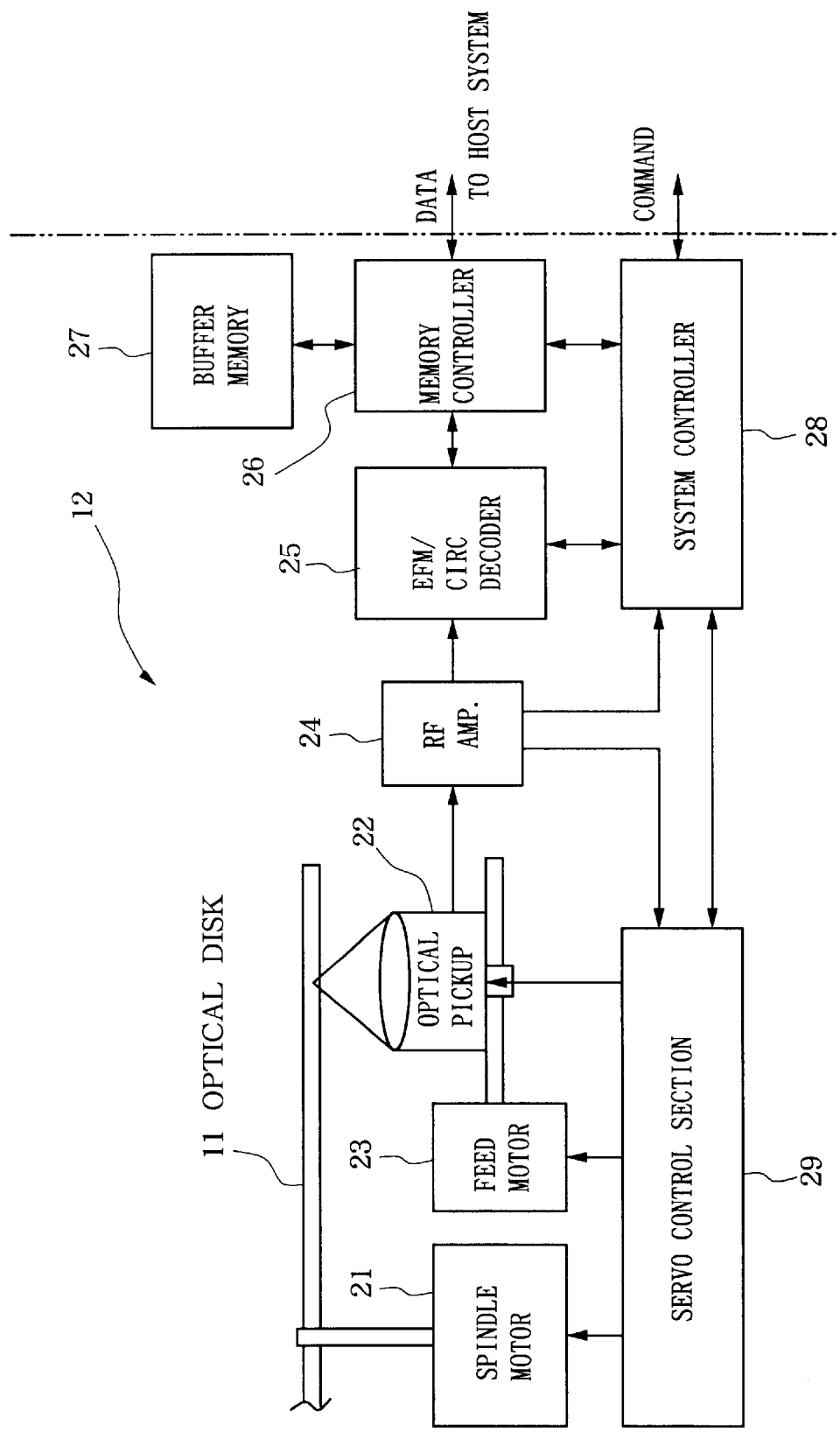
FIG. 7 is a block diagram showing an exemplary hardware setup of an optical disk drive device employed in the reproduction system of FIG. 1.

FIG. 7 is a block diagram showing an exemplary hardware setup of the optical disk drive device 12 of FIG. 1.

The optical disk drive device 12 includes a spindle motor 21 that drives the optical disk 11 to rotate, typically, at constant linear velocity. Optical pickup 22, functioning as a readout means, is disposed in opposed relation to the recording surface of the optical disk 11. The optical pickup 22 is controllably driven by a feed motor 23 to move in the radial direction of the optical disk 11. Output (read-out) data from the optical pickup 22 are each amplified via an RF (high-frequency) amplifier 24 and then passed to an EFM/CIRC (Cross Interleaved Reed-Solomon Code) decoder 25 that performs EFM-demodulating and CIRC-decoding operations on the read-out data. The data demodulated and decoded by the decoder 25 is temporarily stored into a buffer memory 27 under the control of a memory controller 26 if the data is the recorded data on the optical disk 11, or is sent to a system controller 28 if the data is the control information.

The data temporarily stored in the buffer memory 27 are sequentially read out therefrom under the control of the memory controller 26 and then output to the host system 13. Servo control section 29 executes focusing and tracking control of the optical pickup 22 on the basis of the output from the RF amplifier 24 and also controls the spindle motor 21 and feed motor 23 in accordance with instructions given from the system controller 28.

Whereas the system controller 28 is capable of interpreting or deciphering the subcodes, it is either capable of or incapable of deciphering the main channel data as the case may be. Thus, the following paragraphs describe exemplary operation of the reproduction system in various possible cases, one by one.

[1] Case where the system controller 28 has the capability to decipher the TOC information recorded in the main channels:

Once the optical disk 11 is inserted in place within the drive device 12, the drive device 12 initializes various parameters to be used therein and also performs operations to lead in focusing, tracking and spindle servo control in the lead-in area LIA (with a radius of 23 to 25 mm). Then, in accordance with preset positional information as to which of the main channels the TOC information is recorded in, the drive device 12 accesses that main channels to read out the TOC information therefrom. The TOC information thus read out by the optical pickup 22 is amplified via the RF amplifier 24 and then decoded via the EFM/CIRC decoder 25, and the thus-decoded TOC information is delivered to the system controller 28.

Then, the system controller 28 deciphers and stores the deciphered TOC information.

The recorded position of the TOC information may be previously set, or specified by a Q-channel subcode frame of the lead-in area LIA. In the former case, the TOC information may be set to be recorded, for example, in part of or throughout the entire lead-in area LIA, or at the beginning of the first track or in any of the predefined empty spaces (pre-gaps).

Where the TOC information is recorded in the program area PGA, the system controller 28 has not yet recognized a recording position along the outermost periphery of the optical disk 11 prior to initiation of the TOC reading operation. Thus, after setting some mechanical limitations, the system controller 28 starts accessing the program area PGA either without recognizing the outermost peripheral recording position or by provisionally recognizing the outermost peripheral recording position from an automatically-assigned default value. Once the TOC information is acquired out, the outermost peripheral recording position can, of course, be known from the acquired TOC information.

In the case where the TOC file is recorded in the program area PGA, the system controller 28 may be programmed to be able to access the TOC file even before the TOC information is read out, or may be allowed to access the TOC file with automatically-assigned default TOC information until the actual TOC information is acquired.

Figure 8:
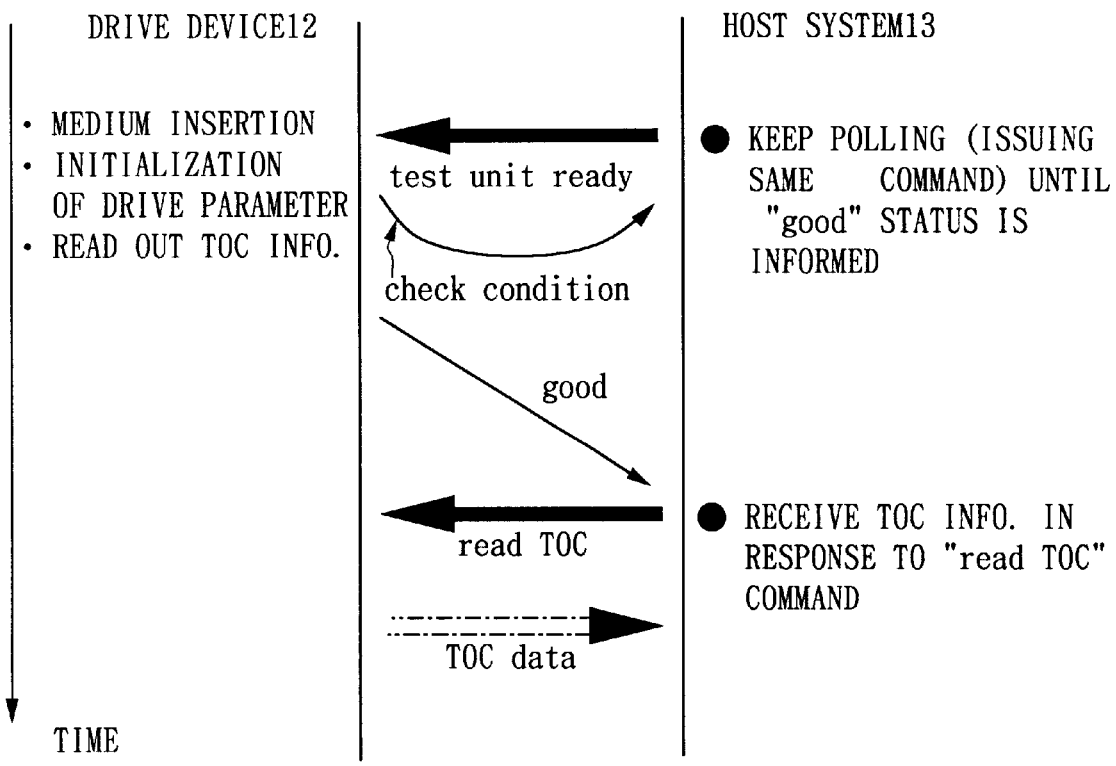
FIG. 8 is a diagram explanatory of exchange of data and commands between the optical disk drive device and a host system of FIG. 1.

FIG. 8 is a diagram explanatory of exchanges of data and commands (SCSI or ATAPI commands) between the optical disk drive device 12 and the host system 13 of FIG. 1. While the drive device 12 is reading out the TOC information recorded in the main channels of the optical disk 11, the host system 13 continues issuing a "test unit ready" command to the drive device 12 until a "good" status signal is received from the drive device 12. Here, the "test unit ready" command is a command to ascertain whether the recording medium, i.e., optical disk 11 has been properly inserted in the drive device 12 and the drive device 12 is ready to accept a read/write or other command. When the drive device 12 is not yet ready (i.e., still in the process of getting ready) to accept an access-related command from the host system 13, it issues a "check condition" status signal to the host system 13. Here, the "check condition" status signal represents an erroneous condition where the drive device 12 is still not ready to accept an access-related command. The drive device 12 initializes parameters to be used therein, and then outputs the "good" status signal to the host device 13 as soon as the TOC information is read out. Upon receipt of the "good" status signal from the drive device 12, the host system 13 issues a "read TOC" command to the drive device 12, in response to which the drive device 12 transfers the TOC information to the host system 13. After that, the drive device 12 is placed in a wait state to await a next instruction.

Once a next instruction is given from the host system 13, the drive device 12 starts reading out necessary information on the basis of the TOC information and content of the instruction.

[2] Case where the system controller 28 has no capability to decipher the TOC information recorded in the main channels:

In this case, the TOC information is acquired by use of data deciphering capability possessed by the host system 13. Because in this case the system controller 28 itself has no capability to decipher the data and information recorded in the main channels, loads on firmware of the system controller 28 can be effectively reduced. Al though the host system 13 as well retains the deciphered TOC information, it can only issue direct instructions based on the minute, second and frame data MIN, SEC and FRAME. After deciphering the TOC information, the host system 13 returns the contents of the deciphered TOC information to the optical disk drive device 12 so that the drive device 12 may also retain the deciphered TOC information. Thereafter, whenever it is necessary for the host system 13 to access the drive device 12 on the track-by-track basis, the drive device 12 is allowed to access the minute, second and frame data MIN, SEC and FRAME by only designating a desired track number rather than the data MIN, SEC and FRAME themselves.

Figure 9:
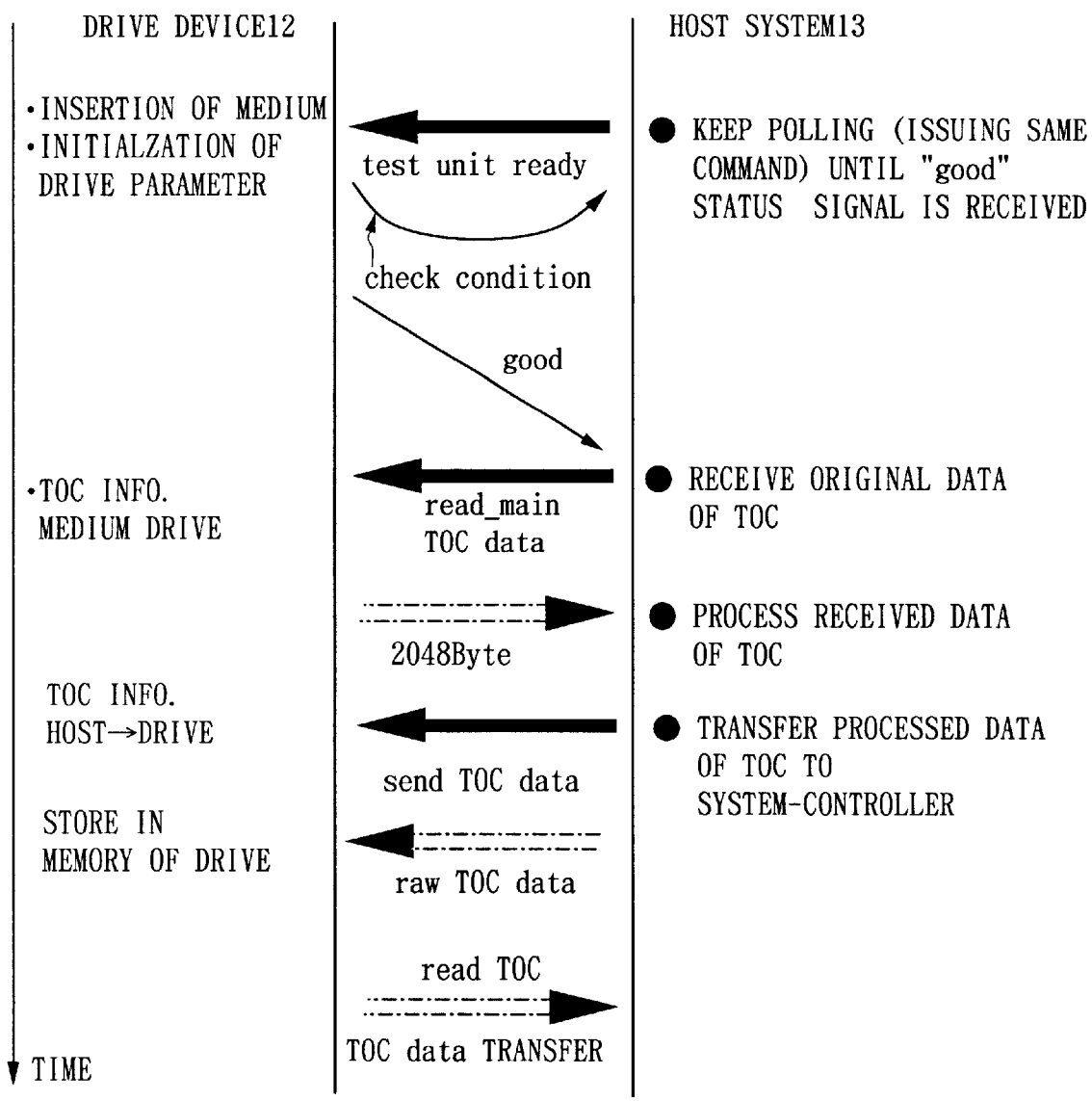
FIG. 9 is a diagram explanatory of another example of the exchange of data and commands between the optical disk drive device and the host system.

(1) In the case where the TOC information is recorded in the lead-in area LIA:

Because same commands as employed for normal access to the normal main channel data recorded in the program and lead-out areas PGA and LOA, can not be applied to the lead-in area LIA, new commands for accessing the main channel data in the lead-in area LIA have to be prepared as exemplarily shown in FIG. 9.

Once a "good" status signal is sent from the drive device 12 to the host system 13 after proper insertion of the optical disk 11 and parameter initialization in the drive device 12, the host system 13. in accordance with the preset information designating particular recorded positions of the main channels which contain the TOC information, issues a command instructing the drive device 12 to read out and transfer the original data of the TOC information from these main channels. In response to the command, the drive device 12 reads out and transfers the 2,048-byte original data of each of the main channels located in designated block positions, so that the host system 13 deciphers the transferred original data to acquire the deciphered TOC information. The thus-acquired deciphered TOC information is then transferred from the host system 13 back to the driver device 12 on the basis of a predetermined protocol. In this case, the above-mentioned commands instructing the drive device 12 to read out and transfer the original data of the TOC information and instructing the host system 13 to transfer the deciphered TOC information are the new commands for accessing the main channel data in the lead-in area LIA.

(2) In the case where the TOC information is recorded in the program area PGA or lead-out area LOA:

In this case, the TOC information can be read out by use of the same commands as employed for access to the normal main channel data recorded in the program area PGA. Thus, the total number of necessary commands in this case can be reduced relative to that in the aforementioned case.

Figure 10:
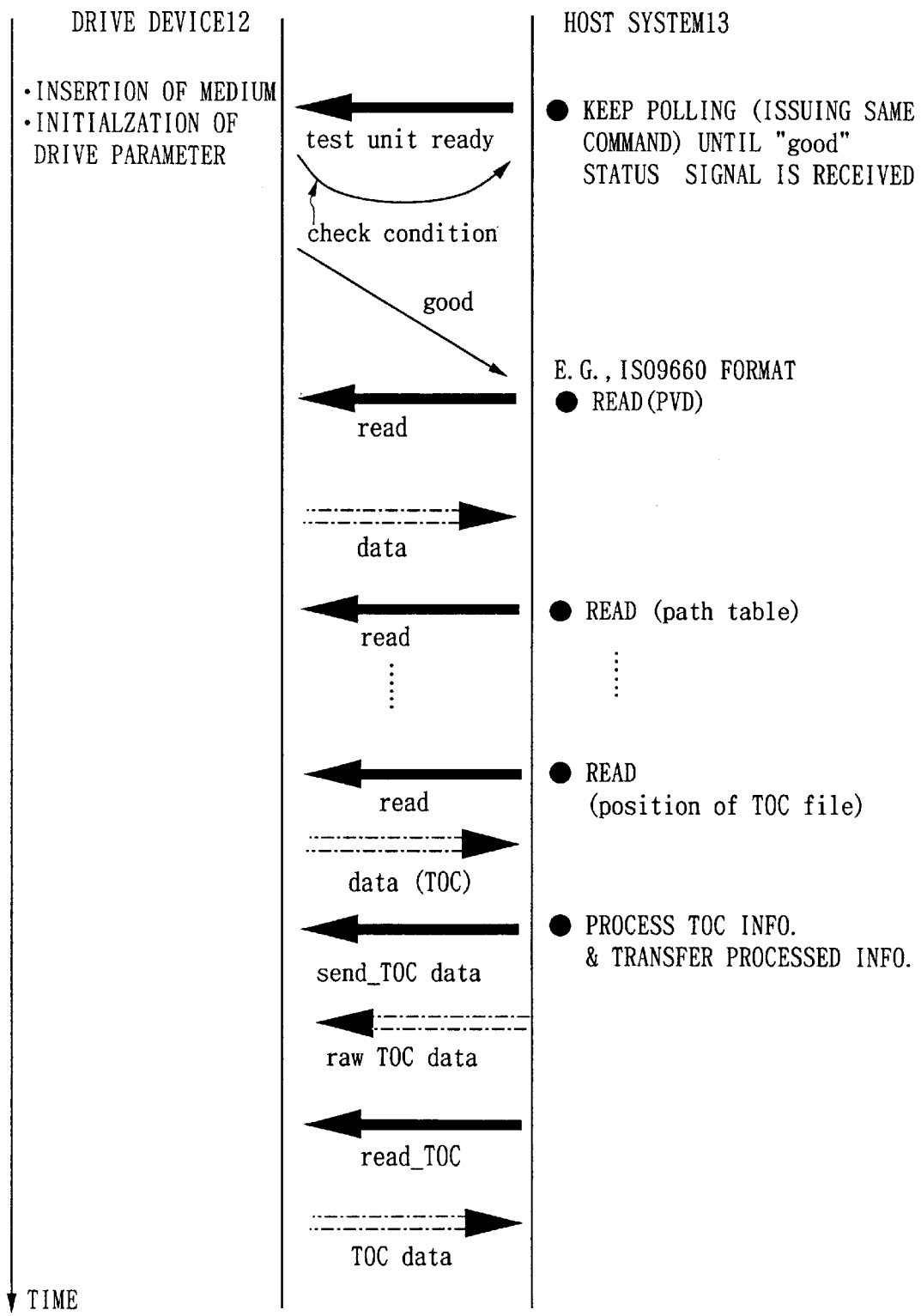
FIG. 10 is a diagram explanatory of yet another example of the exchange of data and commands between the optical disk drive device and the host system.
Figure 11:
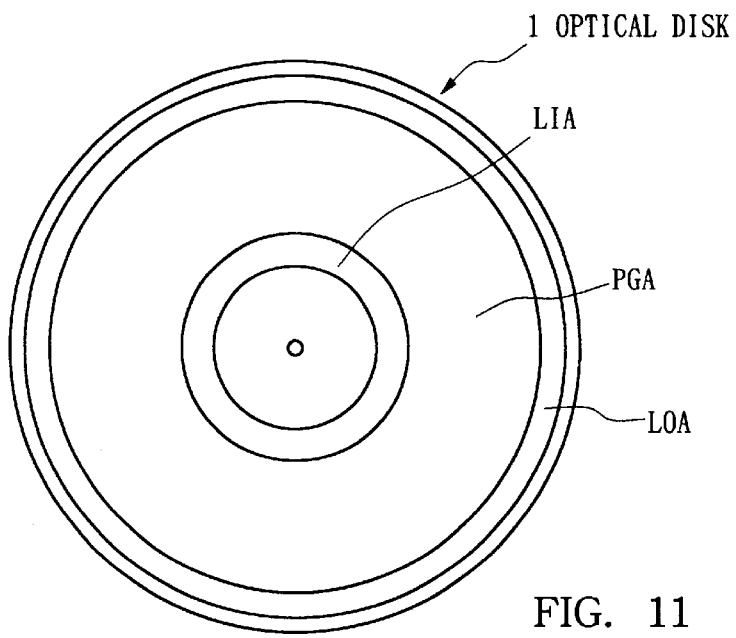
FIG. 11 is a view schematically showing recording areas of an optical disk.
Figure 12:
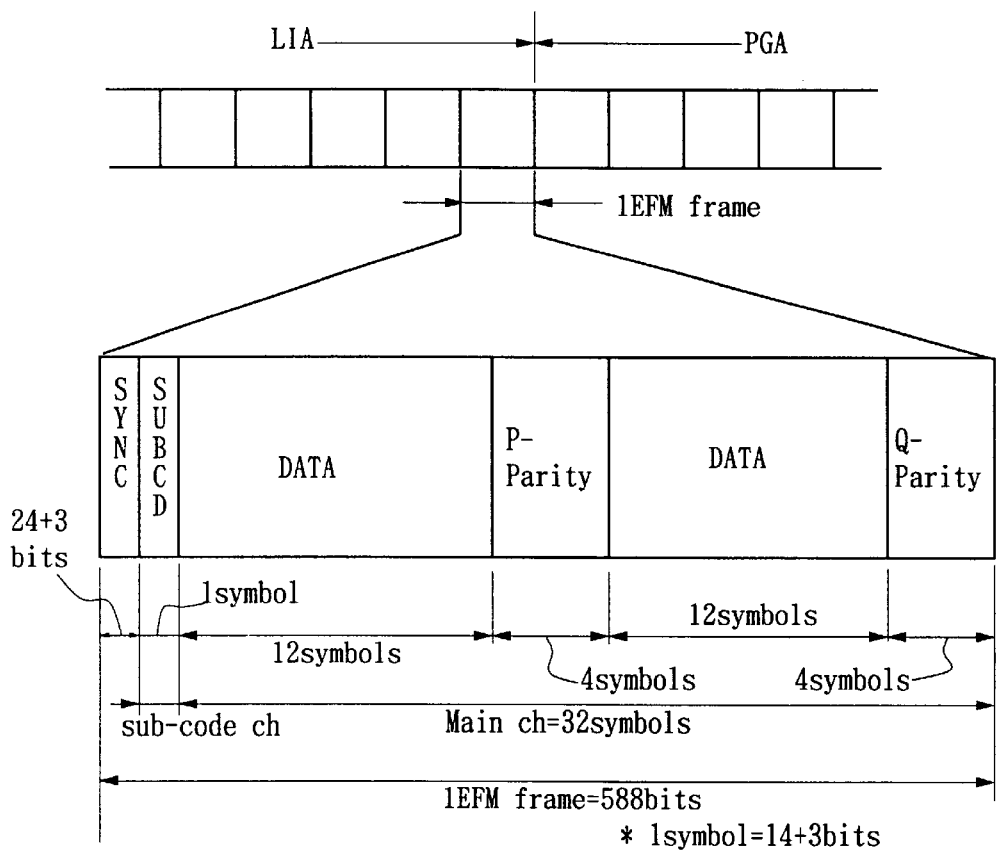
FIG. 12 is a diagram showing an exemplary format of an EFM frame of the optical disk shown in FIG. 11.
Figure 13:
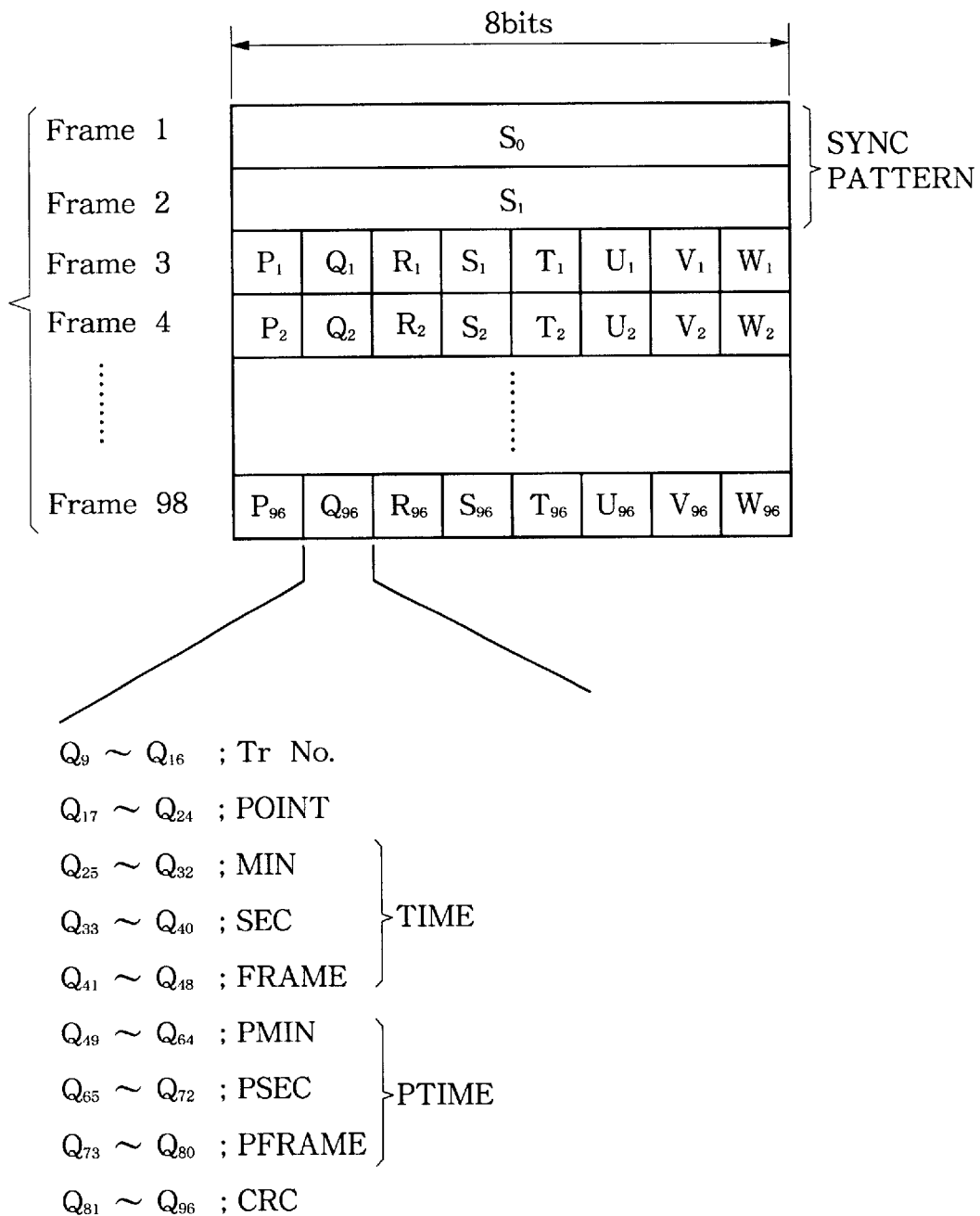
FIG. 13 is a diagram showing an example of a subcode block of the optical disk shown in FIG. 11.

FIG. 10 is a diagram explanatory of an example where the TOC information is recorded as an "ISO9660" file. In this case, the conventional commands for reading a PVD (Primary Volume Descriptor), bus table and TOC file can be used directly.

In summary, the present invention as has been described so far is characterized in that the table-of-contents or TOC information is recorded, rather than in the subcode channels or as subcode data, in the main channels having a much greater capacity than the subcode channels. Thus, the present invention can record the table-of-contents information collectively as a single data block, thereby eliminating the need for recording it dispersedly in a multiplicity of subcode frames as in the past. With such an arrangement, the present invention affords the superior benefit that the table-of-contents information can be read out collectively within a short period of time and hence at a greatly increased speed.

What is claimed is:

1. An optical disk having various information recorded thereon on a frame-by-frame basis, each of a plurality of frames being organized in a predetermined format comprising:

a main channel where data are recorded; and a subcode for providing additional information including recorded positions of the data, wherein table-of-contents information for the data recorded in the main channel is contained in the main channel of the optical disk.

2. An optical disk as recited in claim 1 wherein when a subcode block representing a single unity of information is composed of a plurality of the subcodes belonging to n frames, the table-of-contents information is contained in the main channels of the n frames in such a manner that every piece of information needed as the table-of-contents information is fully incorporated in a predetermined data block made up of the data of the main channels belonging to the n frames.

3. An optical disk as recited in claim 2 which includes a lead-in area, program area and lead-out area and wherein the table-of-contents information is contained in the main channels of the lead-in area.

4. An optical disk as recited in claim 2 which includes a lead-in area, program area and lead-out area and wherein the table-of-contents information is contained in the main channels of at least one of the program area and the lead-out area.

5. An optical disk as recited in claim 1 which includes a lead-in area, program area and lead-out area and wherein the table-of-contents information is contained in the main channels of the lead-in area.

6. An optical disk as recited in claim 1 which includes a lead-in area, program area and lead-out area and wherein the table-of-contents information is contained in the main channels of at least one of the program area and the lead-out area.

7. An optical disk drive device, comprising:

a readout section that reads out recorded information from an optical disk having various information recorded thereon on a frame-by-frame basis, each of a plurality of frames having a main channel where data are recorded, and a subcode for providing additional information including recorded positions of the data, table-of-contents information, for the data recorded in the main channel, being contained in the main channel of the optical disk;

a decoder section that decodes the recorded information read out by said readout section; and a system controller that, upon start of information readout by said readout section, reads out the recorded information from a position of the optical disk containing the table-of-contents information in a predetermined order and deciphers the table-of-contents information, said system controller controlling access, by said readout section, to the optical disk based on the table-of-contents information deciphered thereby.

8. An optical disk drive device as recited in claim 7 wherein the table-of-contents information is recorded substantially throughout a lead-in area of the optical disk, and said system controller acquires the table-of-contents information by accessing the lead-in area of the optical disk.

9. An optical disk drive device as recited in claim 7 wherein the table-of-contents information is recorded in a predetermined position of the optical disk, and said system controller acquires the table-of-contents information by accessing the predetermined position of the optical disk.

10. An optical disk drive device as recited in claim 7 wherein the table-of-contents information is recorded as a file in a predetermined position of the optical disk, and said system controller acquires the table-of-contents information by accessing the predetermined position of the optical disk and reading the file of the table-of-contents information.

11. An optical disk reproduction system comprising:

an optical disk drive device that reads out and decodes recorded information from among various information recorded on an optical disk on a frame-by-frame basis, each of a plurality of frames comprising a main channel where data are recorded and a subcode providing additional information including recorded positions of the data, wherein table-of-contents information, for the data recorded in the main channel, is contained in the main channel of the optical disk, said optical disk drive device controlling information readout from the optical disk based on the table-of-contents information; and a host system that deciphers the table-of-contents information, read out from the optical disk and decoded by said optical disk drive device, to provide deciphered table-of-contents information, and transfers the deciphered table-of-contents information back to said optical disk drive device.

12. An optical disk reproduction system as recited in claim 11 wherein the table-of-contents information is recorded in a predetermined position of the optical disk, and said host system sends said optical disk drive device a read command instructing said optical disk drive device to read out the data of the main channel from the predetermined position, and wherein said host system deciphers the data, read out from the optical disk by said optical disk drive device in response to the read command, to provide deciphered table-of-contents information, and transfers the deciphered table-of-contents information back to said optical disk drive device.

13. An optical disk reproduction system as recited in claim 11 wherein the table-of-contents information is recorded as a file in a predetermined position of the optical disk, and said host system sends said optical disk drive device a read command instructing said optical disk drive device to read out the file of the table-of-contents information from the predetermined position, and wherein said host system deciphers a content of the file, read out from the optical disk by said optical disk drive device in response to the read command, to provide deciphered table-of-contents information, and transfers the deciphered table-of-contents information back to said optical disk drive device.

14. An optical disk including a lead-in area, a program area, and a lead-out area, the optical disk having various information recorded thereon on a frame-by-frame basis, each of a plurality of frames being organized in a predetermined format comprising:

a main channel where data are recorded; and a subcode for providing additional information including recorded positions of the data, wherein table-of-contents (TOC) information for the data recorded in the main channel is contained in the main channel of the optical disk, and the TOC information is recorded in the program area.

* * * * *